US011434362B2

(12) United States Patent
Zarka et al.

(10) Patent No.: US 11,434,362 B2
(45) Date of Patent: Sep. 6, 2022

(54) USE OF VINYL ACETATE-COPOLYMERS AS A SHRINKAGE-REDUCING ADDITIVE IN COLD-CURING SYSTEMS

(71) Applicant: WACKER CHEMIE AG, Munich (DE)

(72) Inventors: Michael Tobias Zarka, Altötting (DE); Karl Weber, Burgkirchen (DE)

(73) Assignee: WACKER CHEMIE AG, Munich (DE)

(*) Notice: Subject to any disclaimer, the term of this patent is extended or adjusted under 35 U.S.C. 154(b) by 399 days.

(21) Appl. No.: 16/490,333

(22) PCT Filed: Mar. 3, 2017

(86) PCT No.: PCT/EP2017/054995
§ 371 (c)(1),
(2) Date: Aug. 30, 2019

(87) PCT Pub. No.: WO2018/157938
PCT Pub. Date: Sep. 7, 2018

(65) Prior Publication Data
US 2020/0157341 A1 May 21, 2020

(51) Int. Cl.
C08L 67/02 (2006.01)
C04B 26/04 (2006.01)
C08F 218/08 (2006.01)
C04B 103/56 (2006.01)

(52) U.S. Cl.
CPC .............. *C08L 67/02* (2013.01); *C04B 26/04* (2013.01); *C08F 218/08* (2013.01); *C04B 2103/58* (2013.01); *C08F 2810/20* (2013.01)

(58) Field of Classification Search
CPC ...... C08L 67/02; C08B 26/04; C08B 2103/58; C08F 218/08; C08F 2810/20
USPC ....................................................... 523/521
See application file for complete search history.

(56) References Cited

U.S. PATENT DOCUMENTS

| 3,718,714 | A | 2/1973 | Comstock et al. |
| 6,034,155 | A | 3/2000 | Espeland et al. |
| 8,952,096 | B2 | 2/2015 | Bauers et al. |
| 9,593,046 | B2* | 3/2017 | Bastelberger ............ C08L 3/08 |
| 2009/0182090 | A1 | 7/2009 | Graewe |
| 2010/0273934 | A1* | 10/2010 | Kohler ...................... C08F 8/46 524/556 |
| 2010/0286347 | A1* | 11/2010 | Kohler ...................... C08F 6/06 526/77 |
| 2011/0319547 | A1* | 12/2011 | Hashemzadeh ............ C08J 3/12 524/503 |
| 2012/0035314 | A1* | 2/2012 | Hashemzadeh ............ C08J 5/24 524/522 |

FOREIGN PATENT DOCUMENTS

| DE | 71072 A | 1/1970 |
| DE | 2163089 A1 | 6/1973 |
| DE | 4124441 A1 | 1/1993 |
| DE | 102007047837 A1 | 5/2009 |
| DE | 102007055694 A1 | 6/2009 |
| DE | 102009001498 A1 | 9/2010 |
| EP | 224370 A2 | 6/1987 |
| EP | 337931 B1 | 2/1996 |
| EP | 2356159 B1 | 8/2014 |
| GB | 1407849 A | 9/1975 |
| WO | 07125035 A1 | 11/2007 |
| WO | 10108791 A1 | 9/2010 |
| WO | 2013144590 A1 | 10/2013 |

OTHER PUBLICATIONS

English abstract for DD 71072 A.
English abstract for DE 4124441 A1.

* cited by examiner

*Primary Examiner* — Michael M. Bernshteyn
(74) *Attorney, Agent, or Firm* — Brooks Kushman P.C.

(57) ABSTRACT

The invention relates to the use of vinyl acetate-copolymers as a shrinkage-reducing additive (low profile additive) in cold-curing systems for producing composite materials, characterized in that vinyl acetate-copolyerisate of 40 to 95 wt % vinyl acetate and 5 to 60 wt % of one or more co-monomers from the group containing vinyl esters of unbranched or branched carboxylic acids having 3 to 20 C-atoms and methacrylic acid esters and acrylic acid esters of unbranched or branched alcohols having 2 to 15 C-atoms are used, wherein the specifications in wt % relate to the total weight of the co-monomers and add up to 100 wt %.

21 Claims, No Drawings

USE OF VINYL ACETATE-COPOLYMERS AS A SHRINKAGE-REDUCING ADDITIVE IN COLD-CURING SYSTEMS

CROSS-REFERENCE TO RELATED APPLICATIONS

This application is a LIS, National Phase Application of PCT/EP2017/054995 filed Mar. 3, 2017 the contents of which are incorporated herein by reference in their entireties for all purposes.

FIELD OF THE INVENTION

The invention relates to the use of vinyl acetate copolymers as a shrinkage-reducing admixture (low profile additive) in cold-curing systems for producing composite materials, more particularly in polymer concrete.

BACKGROUND OF THE INVENTION

In cold-curing systems for producing composite materials (composites), these being systems which cure at <60° C., preferably at room temperature, viz. at temperatures≤40° C., it is usual to use a resin component comprising unsaturated polyester resins (UP resins) or vinyl ester resins (VE resins). These cold-curing, radically crosslinkable polymer compositions further comprise monomers with ethylenically unsaturated groups, generally styrene or methacrylate monomers. These monomers are added to the cold-curing, radically crosslinkable polymer composition in order to dissolve the crosslinkable polymer and in order to ensure that the cold-curing, radically crosslinkable polymer composition is a fluid mass. To initiate the crosslinking of the unsaturated polyester resin or vinyl ester resin, peroxide or hydroperoxide initiators are generally employed. For cold curing, preference is given additionally to using accelerators in order to accelerate the decomposition of the initiator at these low temperatures—cobalt salts, for example.

As further constituents, the cold-curing, radically crosslinkable polymer compositions optionally further comprise fiber materials such as glass fibers, carbon fibers, natural fibers or corresponding fiber mats (Fiber Reinforced Plastic composites=FRP composites), which lead to reinforcement of the composite components obtainable by curing the radically crosslinkable polymer compositions.

Cold-curing, radically crosslinkable polymer compositions are also used for producing polymer concrete. Polymer concrete is a general term for composite materials comprising mineral fillers such as quarts, basalt and granite, chalk, expanded clay, perlite, which are present in a defined particle-size composition (grading curve) and which instead of cement are bound with a mixture composed of reactive resin, monomer, initiator, and accelerator.

A problem associated with the processing of radically crosslinkable polymer compositions into reinforced or filled components and materials is the shrinkage in volume they undergo in the course of the curing of the polymer composition. To reduce the shrinkage in the course of curing, therefore, the radically crosslinkable polymer compositions are admixed with shrinkage-reducing admixtures, known as low profile additives (LPAs). Low profile additives reduce the shrinkage on cure, subdue intrinsic stresses, reduce microcracking, and facilitate compliance with manufacturing tolerances.

The shrinkage-reducing admixtures (low profile additives) are customarily thermoplastics such as polystyrene, polymethyl methacrylate and, in particular, polyvinyl acetate, which frequently further include carboxyl-functional comonomer units. Low profile additives based on vinyl acetate and ethylenically unsaturated carboxylic acids are described for example in DE-A 2163089, U.S. Pat. No. 3,718,714 A, or in WO 2007/125035 A1. DE-A 102007055694 discloses low profile additives based on polymers which are obtained by polymerization of vinyl esters and ethylenically unsaturated, epoxy-functional monomers, and subsequent polymer-analogous reaction of the resultant polymers with an ethylenically unsaturated carboxylic acid.

However, the polymers described develop their activity as a shrinkage-reducing admixture (LPA) only when crosslinkable polymer compositions are cured at elevated temperatures of 60° C. and above. At room temperature, the usual LPAs prove inactive or insufficiently active. In a large number of processes for producing composite components, such as the hand layup process or infusion or injection processes, such as vacuum infusion or RTM-light, for example, the crosslinkable polymer compositions are indeed cured at such low temperatures—at room temperature, for example. Polymer concrete as well is cured generally at room temperature.

EP 224370 A2 describes a cold-curing polymer concrete composition which is obtained by blending unsaturated ortho-polyester resin, peroxide crosslinker, mineral fillers, and polystyrene powder as LPA, and subsequently carrying out curing. U.S. Pat. No. 6,034,155 A describes a cold-curing polymer concrete composition in which a hybrid polyester-polyurethane resin is employed as LPA.

EP 2356159 B1 describes specific graft polymers which are active as low profile additives even at room temperature. The technical preparation of these graft polymers takes place in a complex three-stage reaction (free radical polymerization, polymer-analogous reaction, and final radical graft copolymerization), which in practice leads to high costs and to poor reproducibility of the LPA effect, since even slight variations in the molecular structure of the graft copolymer can cause large fluctuations in the activity as a "room-temperature LPA".

The shrinkage-reducing admixture used in EP 337931 B1 comprises vinyl acetate-vinyl versatate copolymers which fake the form of a dispersion powder with a fraction of polyvinyl alcohol as protective colloid and of inert antiblocking agent. A disadvantage in particular is the high viscosity which results in the case of blending with styrene or UP resin.

Against this background, the object was to provide low profile additives (LPAs) which counteract the volume shrinkage in the course of the curing of radically crosslinkable polymer compositions, even when curing takes place at low temperatures of ≤40° C., which exhibit good processing properties, i.e. low viscosity in blends with monomer (styrene) or UP resin, and which are obtainable in a simple direct copolymerization from monomers that are available commercially.

BRIEF SUMMARY OF THE INVENTION

A subject of the invention is the use of vinyl acetate copolymers as a shrinkage-reducing admixture (low profile additive) in cold-curing systems for producing composite materials, characterized in that vinyl acetate copolymers of 40 to 95 wt % vinyl acetate and 5 to 60 wt % one or more comonomers from the group containing vinyl esters of unbranched or branched carboxylic acids having 3 to 20 carbon atoms and methacrylic esters and acrylic esters of unbranched or branched alcohols having 2 to 15 carbon atoms are used, the figures in wt % being based on the total weight of the comonomers and adding up to 100 wt %.

DETAILED DESCRIPTION OF PREFERRED EMBODIMENTS

Cold-curing systems for producing composite materials are those radically crosslinkable polymer compositions which cure at a temperature of <60° C., preferably 0° C. to 50° C., more preferably 0° C. to 40° C.

Preferred as vinyl esters of unbranched or branched carboxylic acids having 3 to 20 carbon atoms are vinyl propionate, vinyl butyrate, vinyl 2-ethylhexanoate, vinyl laurate, 1-methylvinyl acetate, and vinyl esters of α-branched monocarboxylic acids having 5 to 13 carbon atoms, as for example vinyl pivalate, VeoVa9®, VeoVa10® or VeoVa11® (trade names of Flexion) Particularly preferred are vinyl laurate (the Wacker Chemie trade name is Versa® 12) and vinyl esters of α-branched monocarboxylic acids having 9 to 10 carbon atoms (VeoVa9® and VeoVa10®). The most preferred is vinyl laurate (vinyl dodecanoate).

Preferred as methacrylic esters and acrylic esters of unbranched or branched alcohols having 2 to 15 carbon atoms are ethyl acrylate, ethyl methacrylate, propyl acrylate, propyl methacrylate, n-, iso- and tert-butyl acrylate, n-, iso- and tert-butyl methacrylate, 2-ethylhexyl acrylate, norbornyl acrylate. Particularly preferred is n-butyl acrylate.

Generally speaking, copolymers of 40 to 95 wt %, preferably 55 to 95 wt %, vinyl acetate and 5 to 60 wt %, preferably 5 to 45 wt %, the stated vinyl esters and/or the stated (meth)acrylic esters are used, based in each case on the total weight of the comonomers for preparing the vinyl acetate copolymer. The most preferred are copolymers of 55 to 95 wt % vinyl acetate with 5 to 45 wt %, based on the total weight of the comonomers, one or more comonomers from the group containing vinyl laurate, vinyl esters of α-branched monocarboxylic acids having 9 to 10 carbon atoms (VeoVa9®, VeoVa10®), and n-butyl acrylate. The very most preferred are copolymers of 55 to 95 wt % vinyl acetate and 5 to 45 wt % vinyl laurate, based on the total weight of the monomers Preferably no comonomers other than vinyl acetate and the stated vinyl esters and (meth) acrylic esters are copolymerized.

The vinyl acetate copolymers have number-average molecular weights Mn of preferably 2000 to 200 000 g/mol, more preferably of 4000 to 100 000 g/mol, and most preferably of 8000 to 35 000 g/mol. The figures for the molecular weights Mn are based on the method of determination by SEC (Size Exclusion Chromatography) using a polystyrene standard in THF at 60° C.

The polymerization is carried out in general in the presence of radical initiators and by means of radical bulk or solution polymerization processes. In the case of implementation of the preferred solution polymerization process, solvents used are preferably an organic solvent or a mixture of organic solvents, or a mixture of one or more organic solvents and water. Preferred solvents or preferred solvent components in solvent mixtures are selected from the group of the alcohols, ketones, esters, ethers, aliphatic hydrocarbons, aromatic hydrocarbons, and water. Particularly preferred solvents are aliphatic alcohols having 1 to 6 carbon atoms such as methanol, ethanol, n-propanol or isopropanol, ketones such as acetone or methyl ethyl ketone, esters such as methyl acetate, ethyl acetate, propyl acetate or butyl acetate, or water. The most preferred are methanol, isopropanol, methyl acetate, ethyl acetate, and butyl acetate.

The polymerization temperature for preparing the vinyl acetate copolymers is 20° C. to 160° C., preferably 40° C. to 140° C. The polymerization takes place generally under reflux and under atmospheric pressure.

Suitable radical initiators are, for example, oil-soluble initiators, such as tert-butyl peroxy-2-ethylhexanoate, tert-butyl peroxypivalate, tert-butyl peroxyneodecanoate, dibenzoyl peroxide, tert-amyl peroxypivalate, di(2-ethylhexyl) peroxydicarbonate, 1,1-bis(tert-butylperoxy)-3,3,5-trimethyl-cyclohexane, and di(4-tert-butylcyclohexyl) peroxydicarbonate. Also suitable are azo initiators such as azobisisobutyronitrile. The initiator are used in general in an amount of 0.005 to 3.0 wt %, preferably 0.01 to 1.5 wt %, based in each case on total weight of the monomers for preparing the copolymers.

The polymerization rate may be controlled through the temperature, the half-lives of the initiators, through use of initiator accelerators, or through the initiator concentration.

The establishment of the molecular weight and of the degree of polymerization is known to the skilled person. It may be done, for example, by adding chain transfer agents, by the ratio of solvent to monomers, by varying the initiator concentration, by varying metering of monomers, and by varying the polymerization temperature. Chain transfer agents are, for example, alcohols, such as methanol, ethanol and isopropanol, aldehydes or ketones, such as acetaldehyde, propionaldehyde, butyraldehyde, acetone or methyl ethyl ketone, or else compounds containing mercapto groups, such as dodecyl mercaptan, mercaptopropionic acid, or silicones containing mercapto groups.

The polymerization may be carried out with all or individual constituents of the reaction mixture being included in an initial charge, or with some of all or of individual constituents of the reaction mixture being included in the initial charge and some metered in subsequently, or by the metering method without an initial charge.

Volatile residual monomers and other volatile constituents may also be removed by distillation or stripping techniques, preferably under reduced pressure.

The composition of the formulations for cold-curing systems for producing composite materials, and also the amounts in which the low profile additives are used, are dependent on the selected production method and are known to the skilled person. Suitable cold-curing, radically crosslinkable polymer compositions comprise as basic constituents a) at least one crosslinkable, unsaturated polyester resin (UP resin) or vinyl ester resin (VE resin), b) at least one monomer with ethylenically unsaturated group, c) at least one initiator from the group of the peroxides or hydroperoxides, d) at least one accelerator, e) optionally fiber materials, and f) optionally mineral fillers.

Generally speaking, the vinyl acetate copolymers as a shrinkage-reducing admixture are applied in a 10 to 70 wt % solution, preferably in a 30 to 50 wt % solution, in ethylenically unsaturated monomer, preferably styrene or methacrylates such as methyl methacrylate (MMA), 1,3-butanediol dimethacrylate (1,3-BDDMA) and 1,4-butanediol dimethacrylate (1,4-BDDMA). With particular preference the vinyl acetate copolymers are applied in a 30 to 50 wt % solution in styrene, 1,4-BDDMA or 1,3-BDDMA. To improve the mechanical strength after curing, it is possible optionally to add 1 to 20 wt %, based on vinyl acetate copolymer, of polyfunctional acrylates or methacrylates such as trimethylolpropane trimethacrylate (TMPTMA) to the solutions.

The amount in which the vinyl acetate copolymers are used as a shrinkage-reducing admixture is generally 4 to 20 wt %, preferably 10 to 20 wt %, based on the total weight of resin a) and monomer b) and vinyl acetate copolymer.

Unsaturated polyester resins (UP resins) suitable as resin a) are available commercially and obtainable by polycondensation of unsaturated and saturated dicarboxylic acids or dicarboxylic anhydrides with polyols. Vinyl ester resins (VE resins) suitable as resin a) are available commercially and obtainable by esterification of epoxy resins with acrylic or methacrylic acid.

The cold-curing, radically crosslinkable polymer compositions further comprise monomers b) with ethylenically unsaturated groups, generally styrene or methacrylate monomers such as methyl methacrylate (MMA) or 1,3- or 1,4-butanediol dimethacrylate. These monomers are added to the cold-curing radically crosslinkable polymer composition in order to dissolve the crosslinkable polymer and in order to ensure that the cold-curing, radically crosslinkable polymer composition is a fluid mass.

To initiate the crosslinking of the unsaturated polyester or vinyl ester resin, peroxide or hydroperoxide initiators c) are used in the cold-curing, radically crosslinkable polymer compositions. Suitable peroxides or hydroperoxides and also the amounts in which they are used are known to the skilled person and are available commercially, as for example cumene hydroperoxide, dibenzoyl peroxide or methyl ethyl ketone peroxide.

In the cold-curing, radically crosslinkable polymer compositions there are preferably also accelerators d) used in order to accelerate the decomposition of the initiator at these low temperatures. Suitable accelerators and also the amounts in which they are used are known to the skilled person and are available commercially, as for example cobalt salts such as cobalt octoate, cobalt neodecanoate or cobalt naphthenate.

The cold-curing, radically crosslinkable polymer compositions may optionally additionally comprise further additives such as fiber materials e) or fillers f), or processing assistants such as thickeners.

Suitable fiber materials e) are, for example, glass fibers, carbon fibers, natural fibers or corresponding fiber mats (Fiber Reinforced Plastic composites=FRP composites), which lead to reinforcement of the composite components obtainable by curing the cold-curing, radically crosslinkable polymer compositions.

The cold-curing, radically crosslinkable polymer compositions may also be used for producing polymer concrete. Polymer concrete is a general term for composite materials composed of mineral fillers such as quartz, basalt, granite, chalk, expanded clay, perlite, which are present in defined particle-size composition (grading curve) and which instead of cement are bound with a mixture of reactive resin, initiator, and accelerator. Cement is used in polymer concrete, if at all, only as a filler, for extending the mineral grading into the ultrafine-grain range, and does not take on any binding effect in polymer concrete. Examples of common applications for polymer concrete are pipes, slabs, shafts, wall segments.

Through the use of the vinyl acetate copolymers as shrinkage-reducing admixtures (low profile additives), cured UP and VE resins (resin-only castings), fiber-reinforced plastics parts or filled molding compounds, and mineral materials bound with UP resin or with VE resin (polymer concrete), are obtained that exhibit significantly reduced shrinkage or exhibit expansion at curing temperatures below 60° C., more particularly on curing at room temperature (≤40° C.).

The examples hereinafter serve for further elucidation of the invention, without limiting it in any way whatsoever.

Example 1

Preparation of a Vinyl Acetate Copolymer 1

A 2 l stirred glass vessel with anchor stirrer, reflux condenser and metering facilities was charged with 40.0 g of vinyl acetate, 21.2 g of vinyl laurate, 22.1 g of isopropanol and 0.5 g of PPV (tert-butyl perpivalate, 75% solution in aliphatics). The initial charge was subsequently heated to 70° C. under nitrogen at a stirrer speed of 200 rpm. When the internal temperature reached 70° C., 200.0 g of vinyl acetate, 81.7 g of vinyl laurate, 6.2 g of isopropanol and initiator solution (0.8 g of PPV) were metered in. The monomer solution was metered in over the course of 240 minutes, and the initiator solution over the course of 300 minutes. After the end of the initiator feeds, polymerization was continued at 80° C. for 3 hours. Under reduced pressure and at elevated temperature, volatile constituents were removed by distillation. The Höppler viscosity of the copolymer, determined according to DIN 53015 (10% in ethyl acetate at 20° C.), was 2.4 mPas, its number-average molecular weight $M_n$ was 15 000 g/mol, its weight-average molecular weight $M_w$ was 55 400 g/mol, determined by size exclusion chromatography in THF at 60° C. relative to narrow-range polystyrene standards.

Example 2

Preparation of a Vinyl Acetate Copolymer 2

A 2 l stirred glass vessel with anchor stirrer, reflux condenser and metering facilities was charged with 40.0 g of vinyl acetate 21.2 g of VeoVa® 10, 22.1 g of isopropanol and 0.5 g of PPV (tert-butyl perpivalate, 75% solution in aliphatics). The initial charge was subsequently heated to 70° C. under nitrogen at a stirrer speed of 200 rpm. When the internal temperature reached 70° C., 200.0 g of vinyl acetate, 81.7 g of VeoVa® 10, 6.2 g of isopropanol and initiator solution (0.8 g of PPV) were metered in. The monomer solution was metered in over the course of 240 minutes, and the initiator solution over the course of 300 minutes. After the end of the initiator feeds, polymerization was continued at 80° C. for 3 hours. Under reduced pressure and at elevated temperature, volatile constituents were removed by distillation.

The Höppler viscosity of the copolymer, determined according to DIN 53015 (10% in ethyl acetate at 20° C.), was 2.5 mPas, its number-average molecular weight $M_n$ was 14 000 g/mol, its weight-average molecular weight $M_w$ was 53 400 g/mol, determined by size exclusion chromatography in THF at 60° C. relative to narrow-range polystyrene standards.

Example 3

Preparation of a Vinyl Acetate Copolymer 3

A stirred tank was charged with 2 kg of isopropanol together with 33.6 kg of vinyl acetate, 8.4 kg of vinyl laurate and 10 g of tert-butyl peroxo-2-ethylhexanoate, and the polymerization was commenced by heating to 72° C. At the start, a further 7 g of butyl peroxo-2-ethylhexanoate were added, and then 170 g of butyl peroxo-2-ethylhexanoate in 700 q of isopropanol were metered in over 6 hours. 240 minutes after the start, the metering of 28 kg of vinyl acetate was commenced, and this metering was continued over a period of 120 minutes. After the end of the metering of vinyl acetate, stirring was continued for 60 minutes more, the temperature was raised to 120° C., the tank was evacuated, and solvent and residual monomer were removed by distillation.

The Höppler viscosity of the copolymer, determined according to DIN 53015 (10% in ethyl acetate at 20° C.), was 5.5 mPas, its number-average molecular weight $M_n$ was 14 000 g/mol, its weight-average molecular weight $M_w$ was 137 000 g/mol, determined by size exclusion chromatography in THF at 60° C. relative to narrow-range polystyrene standards.

Testing of the use of the vinyl acetate copolymers as shrinkage-reducing admixtures (LPAs):

1.) Curing of UP resin compositions at 23° C.:

A mixture was produced from the raw materials listed in Table 1, and was briefly degassed. The density $D_p$ of the degassed mixture was ascertained, and the mixture was then poured into a mold and cured at room temperature (23° C.) for 48 hours. Finally, the density $D_c$ of the cured molding was determined. The shrinkage was ascertained by comparing the density $D_p$ of the mixture prior to curing with the density $D_c$ of the molding after curing, using the formula Shrinkage (%)=$(D_c-D_p/D_c) \times 100$ (Table 2). Minus values indicate that the molding after curing was larger than the original mold.

The density was measured in each case using the DMA 38 density measuring apparatus (manufacturer: Anton Paar GmbH) at room temperature (23° C.).

TABLE 1

Formulation for polymeric moldings:

| Type | Raw material | Parts by weight |
|---|---|---|
| Palapreg ® P18-03 | UP resin (around 65.0% in styrene) | 80.0 |
| LPA | LPA (40% in styrene) | 20.0 |
| Butanox ® M 50 | Peroxide | 1.5 |
| Akzo Nobel NL-49 | Accelerator (1% Co in ester) | 0.5 |

Low profile additives (LPAs) used were as follows:

LPAC1 (comparative):
Vinnapas® C501 (acid-modified polyvinyl acetate from Wacker Chemie AG).

LPAC2 (comparative):
Vinnapas® B 100 SP (polyvinyl acetate from Wacker Chemie AG).

LPAC3 (comparative):
Degalan LP 53/13 (acid-modified polymethyl methacrylate from Evonik AG).

LPAC4 (comparative):
Modiper® SV10 A (acid-modified styrene/vinyl acetate block copolymer from Nippon Oil and Fats Company, Limited).

LPA1:
Vinyl acetate copolymer 1 with 70 wt % vinyl acetate and 30 wt % vinyl laurate LPA2:
Vinyl acetate copolymer 2 with 70 wt % vinyl acetate, 24 wt % VeoVa®10 and 6 wt % vinyl laurate LPA3:
Vinyl acetate copolymer 3 with 88 wt % vinyl acetate and 12 wt % vinyl laurate

TABLE 2

Shrinkage of the moldings:

| LPA | Density $D_p$ of the mixture prior to curing [g/mm³] | Density $D_c$ of the molding after curing at 23° C. [g/mm³] | Shrinkage [%] |
|---|---|---|---|
| — | 1.093 | 1.195 | 8.53 |
| LPA1 | 1.055 | 1.047 | −0.76 |
| LPA2 | 1.059 | 1.077 | 1.67 |
| LPA3 | 1.052 | 1.063 | 1.03 |
| LPAC1 | 1.062 | 1.150 | 7.65 |
| LPAC2 | 1.064 | 1.162 | 8.43 |
| LPAC3 | 1.063 | 1.149 | 7.48 |
| LPAC4 | 1.041 | 1.112 | 6.38 |

From Table 2 it is evident that conventional LPAs (LPAC1-LPAC4) have virtually no activity, or none, at room temperature (here 23° C.). Relative to the formulations of the invention with vinyl acetate copolymers (LPA1, LPA2 and LPA3), the comparative substances LPAC1 to LPAC4 showed virtually no activity in the room-temperature curing.

The hydrophobic vinyl acetate copolymers LPA1, LPA2 and LPA3, in contrast, exhibited very good activity even at 23° C., hence resulting in a significantly reduced shrinkage and even, in the case of LPA1, in slight expansion.

2.) Curing of polymer concrete compositions at 23° C.:

A polymer concrete mixture was produced from the raw materials listed in Table 3, and the mixture was poured into a mold and cured at room temperature (23° C.) for 48 hours. For this purpose, the mixture was introduced into a silicone mold having internal dimensions of 10 mm×50 mm×1000 mm, whose base was lined with a perforated metal sheet (1000 mm×50 mm×1 mm) as a backing. If the polymer concrete composition shrinks during the cure, the specimen bulges upward, with the curvature increasing in line with the shrinkage. The height of the curvature in the center of the specimen relative to the ends of the specimen was measured in mm. The linear shrinkage was calculated from this, using the following formula:

Thickness(mm)×curvature(mm)/125(mm×m)=mm/m.

A linear shrinkage of 1 mm/m then corresponds to 0.1%.

Tables 3 and 4:

Formulation and testing for polymer concrete moldings:

TABLE 3

| | Test Run (TR), constituents in parts by weight | | | |
|---|---|---|---|---|
| | TR1 | TR2 | TR3 | TR4 |
| Quartz sand 8a - HR 0.1 - 0.6 T | 26.7 | 26.7 | 26.7 | 26.7 |
| Quartz sand 4extra - HR 1 - 1.8 T | 26.7 | 26.7 | 26.7 | 26.7 |
| Quartz sand F 36 | 26.7 | 26.7 | 26.7 | 26.7 |
| Palatal P61/02 UP resin from Aliancys AG | 20 | 17 | 14 | 13 |
| Accelerator NL-49P Co accelerator from AkzoNobel | 0.5 | 0.1 | 0.1 | 0.1 |
| Curox M-312 epoxide curative, United Initiators | 1 | 1 | 1 | 1 |
| LPA3 solution (40% in styrene) | 0 | 3 | 6 | 7 |
| Linear shrinkage % | 0.43 | 0.20 | 0.08 | 0.03 |

TABLE 4

|  | Test Run (TR), constituents in parts by weight | | |
| --- | --- | --- | --- |
|  | TR5 | TR6 | TR7 |
| Quartz sand 8a - HR 0.1 - 0.6 T | 17.5 | 17.5 | 27.5 |
| Quartz sand 4extra - HR 1 - 1.8 T | 0 | 0 | 0 |
| Quartz sand F 36 | 17.5 | 17.5 | 17.5 |
| Palatal P61/02 UP resin from Aliancys AG | 25 | 16.25 | 16.25 |
| Accelerator NL-49P Co accelerator from AkzoNobel | 0.1 | 0.07 | 0.07 |
| Curox M-312 epoxide curative, United Initiators | 1 | 1 | 1 |
| LPA3 solution (40% in styrene) | 0 | 8.75 | 8.75 |
| Omyacarb - 40GU chalk from Omya | 40 | 40 | 30 |
| Linear shrinkage % | 0.63 | 0.01 | 0.02 |

Discussion of Results:

A feature of the vinyl acetate-vinyl laurate copolymer used in the formulation of polymer concrete moldings is that the viscosity in a 40 wt % styrene solution is only around 1000 mPas (Brookfield viscosity at 23° C., 100 rpm, spindle 4). Such low viscosities are essential for effective wetting of fibers and fillers, and are a prerequisite for formulations with high fractions of solid and/or fiber. The redispersible vinyl acetate-vinyl versatate copolymers mentioned in EP 337931 B1 as a shrinkage-reducing admixture, in contrast, even at a concentration of 20 wt % in styrene, lead to a viscosity of 100 000 mPas or more (Brookfield viscosity at 23° C., 100 rpm, spindle 4).

Even in a very small fraction, the vinyl acetate copolymers act very effectively as shrinkage-reducing admixtures in polymer concrete formulations. The Test Run TR3 shows that even at a low fraction of 6 wt %, a substantial reduction in shrinkage is obtained (wt % based on the total weight of resin a) and monomer b) and vinyl acetate copolymer).

The invention claimed is:

1. A method for producing a cold-curing unsaturated polymer system for producing composite materials, which cures at a temperature less than 60° C., comprising:
    mixing constituents comprising:
        a) at least one crosslinkable, unsaturated polyester resin or vinyl ester resin,
        b) at least one ethylenically unsaturated monomer,
        c) at least one peroxide and/or hydroperoxide,
        d) at least one cobalt salt accelerator,
        e) optionally fiber material, and
        f) optionally mineral fillers; and
        g) a shrinkage-reducing admixture, the shrinkage reducing admixture comprising a vinyl acetate copolymer of 40 to 95 wt % of vinyl acetate and 5 to 60 wt % of one or more vinyl-functional comonomers selected from the group consisting of vinyl esters of unbranched or branched carboxylic acids having 3 to 20 carbon atoms, (meth)acrylic esters of unbranched or branched alcohols having 2 to 15 carbon atoms, and mixtures thereof wherein the percentages in wt % are based on the total weight of comonomers in the vinyl acetate copolymer.

2. The method of claim 1, wherein the vinyl acetate copolymers comprise 55 to 95 wt % vinyl acetate and 5 to 45 wt % of vinyl-functional comonomers, based on the total weight of all monomers.

3. The method of claim 1, wherein the shrinkage reducing admixture comprises at least one vinyl acetate copolymer of vinyl acetate with comonomers selected from the group consisting of vinyl laurate and vinyl esters of α-branched monocarboxylic acids having 9 to 10 carbon atoms, and mixtures thereof.

4. The method of claim 1, wherein the shrinkage reducing admixture comprises at least one vinyl acetate copolymer of vinyl acetate with one or more comonomers selected from the group consisting of ethyl acrylate, ethyl methacrylate, propyl acrylate, propyl methacrylate, n-, iso- and tert-butyl acrylate, n-, iso- and tert-butyl methacrylate, 2-ethylhexyl acrylate, norbornyl acrylate, and mixtures thereof.

5. The method of claim 1, wherein the vinyl acetate copolymer consists of a copolymer of 40 to 95 wt % of vinyl acetate and 5 to 60 wt % of one or more vinyl-functional comonomers selected from the group consisting of vinyl esters of unbranched or branched carboxylic acids having 3 to 20 carbon atoms, (meth)acrylic esters of unbranched or branched alcohols having 2 to 15 carbon atoms and mixtures thereof, wherein the percentages in wt % are based on the total weight of comonomers in the vinyl acetate copolymer, with no further comonomers.

6. The method of claim 1, wherein the vinyl acetate copolymer is prepared by bulk polymerization or solution polymerization.

7. The method of claim 1, wherein the shrinkage-reducing admixture is free of polyvinyl alcohol protective colloid.

8. The method of claim 1, wherein the cold curing system cures at a temperature of 40° C. or less.

9. The method of claim 1, wherein the cold-curing system comprises a polymer concrete which is cement-free.

10. The method of claim 1, wherein styrene is present as an ethylenically unsaturated monomer.

11. The method of claim 1, wherein the composition cures at a temperature of from 0° C. to 40° C.

12. A cold-curing, radically crosslinkable unsaturated polymer composition for producing composite materials which cures at a temperature of less than 60° C., comprising:
    a) at least one crosslinkable, unsaturated polyester resin or vinyl ester resin,
    b) at least one ethylenically unsaturated monomer,
    c) at least one peroxide and/or hydroperoxide initiator,
    d) at least one cobalt salt accelerator,
    e) optionally fiber materials,
    f) optionally mineral fillers, and
    g) a polyvinyl acetate copolymer comprising 40 to 95 wt % vinyl acetate and 5 to 60 wt % of one or more vinyl-functional comonomers selected from the group consisting of vinyl esters of unbranched and branched carboxylic acids having 3 to 20 carbon atoms and methacrylic esters and acrylic esters of unbranched or branched alcohols having 2 to 15 carbon atoms, the figures in wt % being based on the total weight of all comonomers and adding up to 100 wt %.

13. The crosslinkable polymer composition of claim 12, which cures at a temperature in the range of 0° C. to 40° C.

14. The cold-curing, radically crosslinkable polymer composition of claim 12, wherein the mineral filler f) comprises at least one mineral filler selected from the group consisting of quartz, basalt, granite, chalk, expanded clay, perlite, and cement, wherein cement, if present, does not act as a binder.

15. The composition of claim 12, which cures to a polymer concrete.

16. The composition of claim 15, which is free of cement.

17. The composition of claim 12, wherein styrene is present as an ethylenically unsaturated monomer.

18. The composition of claim 12, wherein the shrinkage-reducing admixture contains no polyvinyl alcohol protective colloid.

19. The composition of claim 12, wherein the polyvinyl acetate copolymer has been prepared by bulk or solution polymerization.

20. The composition of claim 12, wherein the polyvinyl acetate copolymer is a copolymer of vinyl acetate with a copolymer selected from the group consisting of vinyl laurate, vinyl esters of α-branched $C_9$-$C_{10}$ monocarboxylic acids, and mixtures thereof.

21. The composition of claim 12, wherein the shrinkage-reducing additive consists of 40 to 95 wt % of vinyl acetate and 5 to 60 wt % of one or more vinyl-functional comonomers selected from the group consisting of vinyl esters of unbranched or branched carboxylic acids having 3 to 20 carbon atoms, (meth)acrylic esters of unbranched or branched alcohols having 2 to 15 carbon atoms, and mixtures thereof wherein the percentages in wt % are based on the total weight of comonomers in the vinyl acetate copolymer, optionally in dissolved form.

* * * * *